United States Patent [19]

Petri et al.

[11] Patent Number: 5,325,719
[45] Date of Patent: Jul. 5, 1994

[54] MAGNETICALLY DRIVEN RESONANT DISC PRESSURE TRANSDUCER

[75] Inventors: Fred Petri, Snohomish; Gene E. Gassner, Redmond, both of Wash.

[73] Assignee: AlliedSignal Inc., Morris Township, Morris County, N.J.

[21] Appl. No.: 8,171

[22] Filed: Jan. 25, 1993

[51] Int. Cl.$^5$ .............................................. G01L 11/00
[52] U.S. Cl. ...................................... 73/702; 310/338
[58] Field of Search ................ 310/26, 338; 73/702, 73/704

[56] References Cited

U.S. PATENT DOCUMENTS 3,789,666  2/1974  Favre ..................................... 73/702
4,550,610  11/1985 EerNisse .
4,644,804  2/1987  Ramm et al. ..................... 73/702 X Primary Examiner—Richard E. Chilcot, Jr.
Assistant Examiner—Joseph L. Felber
Attorney, Agent, or Firm—Howard G. Massung

[57] ABSTRACT

A vibrating disc transducer assembly suitable for accurately measuring high pressures utilizes a transducer having a vibratory disc that is preferably fabricated from silicon and excited to vibrate in the thickness-shear mode. The excitation is accomplished by placing the resonator in a magnetic field and passing an electric current through electrodes on opposite sides of the disc. The transducer is supported in a housing that communicates with the medium whose pressure is being measured.

21 Claims, 2 Drawing Sheets

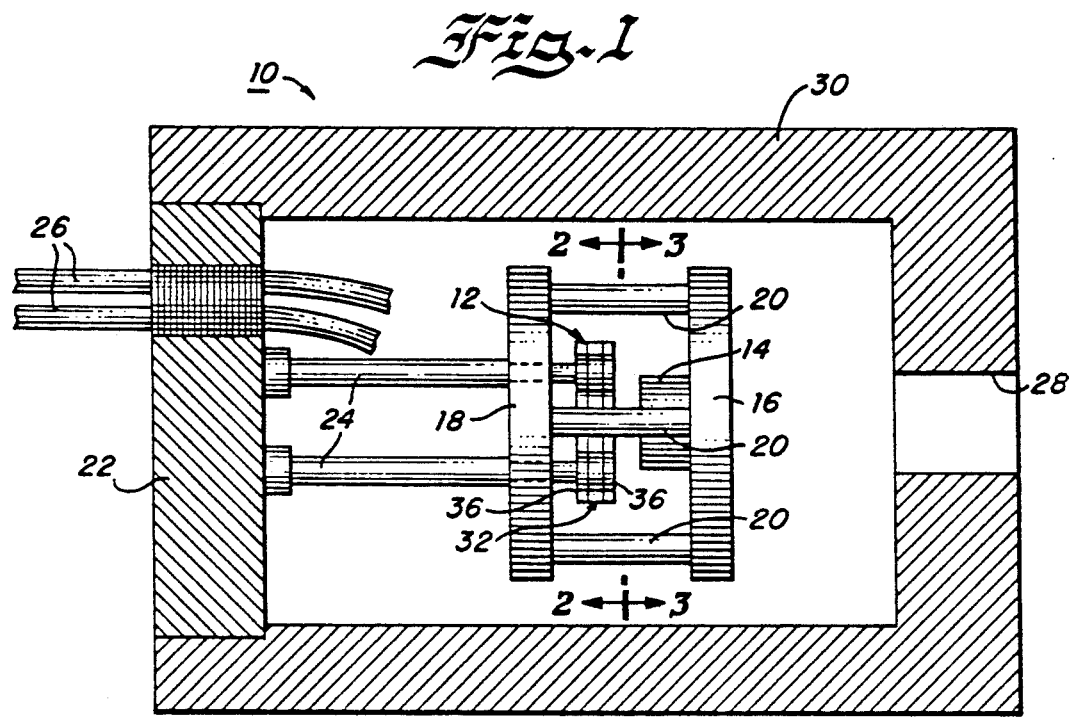
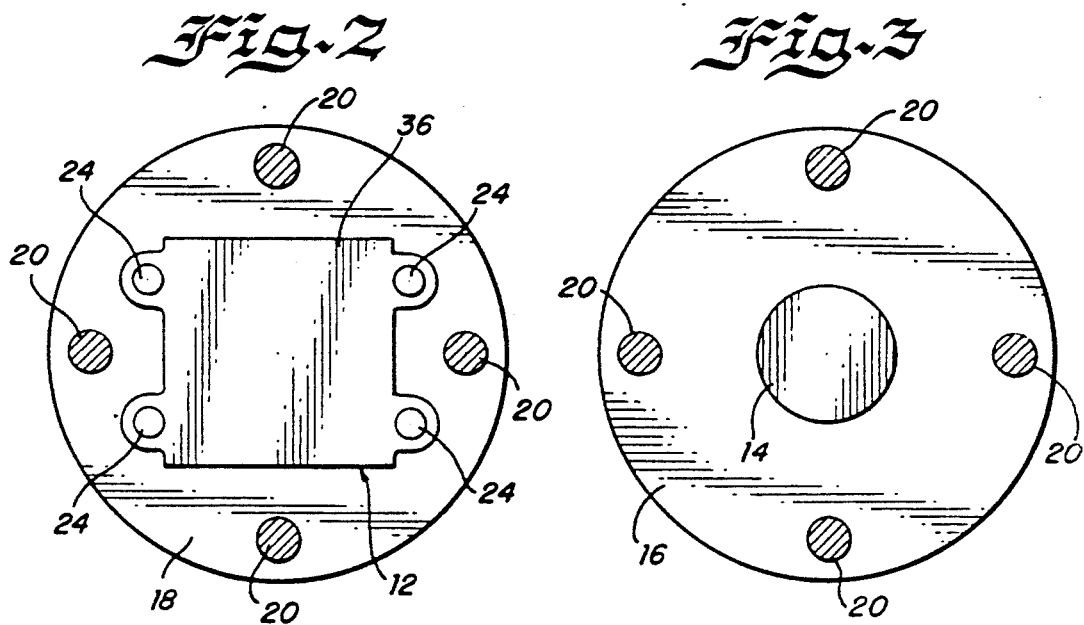

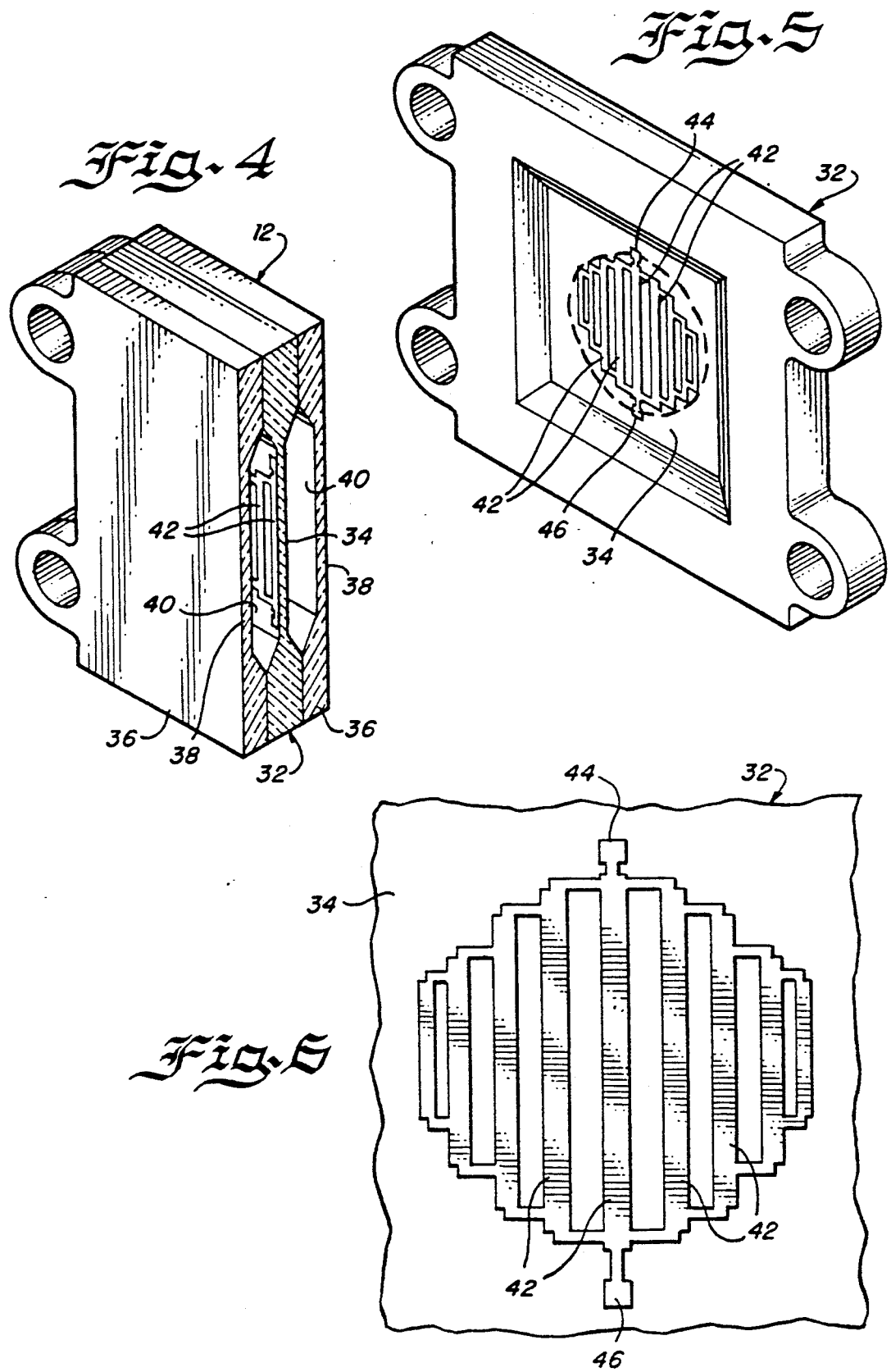

MAGNETICALLY DRIVEN RESONANT DISC PRESSURE TRANSDUCER

BACKGROUND OF THE INVENTION

1. Field of the Invention

This invention relates generally to resonating transducers, and more particularly to a magnetically driven resonant disc pressure transducer, capable of measuring high pressures accurately.

2. Description of the Prior Art

Resonant pressure transducers are known, and many are capable of providing highly accurate readings at high pressures. One such device is fabricated from quartz and is disclosed in U.S. Pat. No. 4,550,610. However, the device described in the U.S. Pat. No. 4,550,610 patent is relatively expensive to manufacture and its minimum size is limited by quartz fabrication techniques.

SUMMARY

Accordingly, it is an object of the present invention to overcome many of the disadvantages of the prior art pressure transducers.

It is another object of the present invention to provide a highly accurate pressure transducer that can be made smaller and less expensively than the prior art pressure transducers.

It is yet another object of the present invention to provide an accurate, compact, magnetically driven pressure transducer.

It is yet another object of the present invention to provide a pressure sensor that employs a vibrating disc that operates in the thickness-shear mode.

It is another object of the present invention to provide a pressure transducer having a magnetically driven vibratory disc.

Accordingly, in accordance with a preferred embodiment of the present invention, there is provided a pressure transducer that has a resonant vibratory disc. Conductors are formed on opposite sides of the disc and the transducer is supported within a magnetic structure that provides a magnetic field that is perpendicular to the disc and the conductors formed thereon. The conductors are connected to appropriate electronic circuitry such as an oscillator circuit so that current flowing through the conductors reacts with the magnetic field to cause the disc to vibrate at the resonant frequency of the disc preferably in the thickness-shear mode. The disc and magnetic assembly are contained in a housing that has an inlet that communicates with the medium whose pressure is being monitored so that pressure variations in the medium being monitored are communicated to the disc and thereby cause the resonant frequency of the disc to change to thereby provide an indication of pressure.

BRIEF DESCRIPTION OF THE DRAWING

These and other objects and advantages of the present invention will become readily apparent upon consideration of the following detailed description and attached drawing, wherein:

FIG. 1 is a simplified side view, partially in cross-section, of the pressure transducer assembly according to the invention showing the mounting structure and magnetic field assembly for the transducer;

FIG. 2 is a cross-sectional view taken along lines 2—2 of FIG. 1 showing the pressure transducer;

FIG. 3 is a cross-sectional view taken along lines 3—3 of FIG. 1 showing the magnetic assembly;

FIG. 4 is a cross-sectional perspective view of the pressure transducer;

FIG. 5 is a perspective view of the active resonator portion of the transducer; and FIG. 6 is a plan view of the electrode pattern on the active resonator.

DETAILED DESCRIPTION OF THE PREFERRED EMBODIMENT

Referring now to the drawing with particular attention to FIG. 1, there is shown a pressure transducer assembly generally designated by the reference numeral 10. The transducer assembly 10 comprises a pressure transducer 12, which in the present embodiment utilizes an active silicon plate that is driven in the thickness-shear mode. Details of the transducer 12 will be discussed in a subsequent portion of the specification. A permanent magnet 14 is disposed in close proximity to the transducer 12 to provide a magnetic flux in a direction perpendicular to the silicon disc within the transducer 12. The permanent magnet 14 is mounted on a disc 16 which is fabricated from a magnetic material and forms part of a magnetic structure surrounding the transducer 12. A second magnetic disc 18 and four magnetic struts 20 (best illustrated in FIGS. 2 and 3) complete the magnetic return path of the magnetic structure.

The magnetic structure and the transducer 12 are supported within a housing 22 by four struts 24. A material having a low thermal coefficient of expansion, such as INVAR, is used to form the struts 24 because its thermal coefficient of expansion approximately matches that of the silicon forming the transducer 12. Consequently, thermally induced variations in the readings of the transducer 12 are minimized. An electrical feed through 26 provides an electrical connection to the transducer assembly and an inlet port 28 allows the transducer 12 to communicate with the medium whose pressure is being measured. An access cover 30 provides access to the transducer assembly.

The transducer 12 is shown in greater detail in FIGS. 4 and 5. Referring to FIG. 4, the transducer assembly 12 has a central active resonant plate or disc 32 that has a circular reduced thickness resonant area 34 (FIG. 5). The disc 32 is preferably fabricated from silicon but could also be formed from other suitable materials. The resonant disc 32 is sandwiched between a pair of silicon plates 36. Each of the plates 36 has a reduced thickness area so that a cavity 40 is formed between the resonant area 34 and each of the plates 36. Each of the cavities 40 is filled with a low pressure gas. The pressure of the gas within the cavity 40 is low enough to permit the circular resonator area 34 to vibrate, but sufficient to transfer pressure changes to the circular area 34 upon deflection of the reduced area wall sections 38 caused by the pressure of the medium being monitored. Preferably, the central area 34 is thinned down to vibrate in the thickness-shear mode in the 1–10 mHz range.

FIG. 6 shows the electrode pattern formed on the resonant area 34 of the disc 32 that causes the disc 34 to vibrate. The electrode pattern includes a plurality of vertical conductors 42 that are connected in parallel to a pair of connecting pads 44 and 46. The pads 44 and 46 are connected in the feedback loop of an oscillator and during oscillation the conductors 42 are energized at a frequency determined by the resonant frequency of the resonator area 34. The same pattern is also formed on the opposite side of the disc 34 and is also energized by the oscillator. However, the pads 44 and 46 are connected to the oscillator in the opposite polarity so that the current flows through the vertical conductors on the opposite sides of the disc 34 in opposite directions. The electrode pattern may be produced by various techniques, including the deposition of gold or another conductive metal or by depositing an epitaxial layer in the regions that are desired to be made conductive.

As the current flows vertically through the conductors 42 and the conductors on the opposite side of the disc 32 in directions, a linear force directed along each surface of the resonator plate 34 induced. The force on one surface, such as the surface illustrated in FIG. 6, will be in an opposite direction to the force induced on the opposite surface. Therefore, the resonant area 34 will vibrate in the thickness-shear mode at the disc resonant frequency. The electrode pattern shown in FIG. 6 will excite the basic 101 thickness-shear mode, however, other patterns may be configured to excite the higher modes if desired.

The force produced by the current flowing through the conductors 42 shown in FIG. 6 and those on the opposite side of the disc is given by the following equation:

$$\vec{F} = \vec{B} \times \vec{I} \tag{1}$$

where:
$\vec{F}$ = force produced in the horizontal direction;
$\vec{B}$ = magnetic flux perpendicular to disc; and
$\vec{I}$ = current flow in vertical direction.

The approximate frequencies of vibration are given by the following relationship:

$$f_{nmk} = n\nu/2e + \nu e \chi^{2mk}/4n(\pi a)^2 \tag{2}$$

where:

$$\nu = \sqrt{C_{ij}/\rho}$$

and:
$c_{ij}$ = appropriate silicon stiffness coefficient;
$\rho$ = density of silicon;
$e$ = thickness of silicon resonator;
$a$ = radius of resonating area; and
$\chi_{mk}$ = kth root of a Bessel function of order m.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A pressure transducer for measuring the pressure of a fluid, comprising:
   a vibratory disc adapted to be disposed in communication with said fluid; and
   means for exciting said disc to vibrate in a thickness-shear mode, the frequency of vibration being representative of the pressure of said fluid, wherein said disc is fabricated from a crystalline non-piezoelectric material.

2. A pressure transducer as recited in claim 1, further including an enclosure surrounding said vibratory disc.

3. A pressure transducer as recited in claim 1, wherein said exciting means includes means for magnetically exciting said disc.

4. A pressure transducer as for measuring the pressure of a fluid, comprising:
   a vibratory disc adapted to be disposed in communication with said fluid;
   means for exciting said disc to vibrate in a thickness-shear mode, the frequency of vibration being representative of the pressure of said fluid; and
   an enclosure surrounding said vibratory disc, wherein said disc and said enclosure are fabricated from silicon.

5. A pressure transducer for measuring the pressure of a fluid, comprising:
   a vibratory disc adapted to be disposed in communication with said fluid;
   means for exciting said disc to vibrate in a thickness-shear mode, the frequency of vibration being representative of the pressure of said fluid; and
   an enclosure surrounding said vibratory disc, wherein said enclosure includes a pair of plates, each plate having a reduced thickness portion, one plate being disposed on each side of said disc, said reduced thickness portions forming two cavities, each cavity being disposed between each plate and the disc.

6. A pressure transducer as recited in claim 5, wherein said reduced thickness portions flex in response to pressure of the fluid whose pressure is being measured.

7. A pressure transducer for measuring the pressure of a fluid, comprising:
   a vibratory disc adapted to be disposed in communication with said fluid;
   means for exciting said disc to vibrate in a thickness-shear mode, the frequency of vibration being representative of the pressure of said fluid, wherein said exciting means includes means for magnetically exciting said disc; and wherein said magnetic exciting means includes a magnetic structure around said disc.

8. A pressure transducer as recited in claim 7, wherein said magnetic structure includes a permanent magnet disposed adjacent said disc and means for providing a magnetic return path for said permanent magnet around said disc.

9. A pressure transducer as recited in claim 7, further including an electrode pattern disposed on said disc that cooperates with said magnetic structure to excite said disc when said electrode pattern is electrically energized.

10. A pressure transducer for measuring the pressure of a fluid, comprising:
    a vibratory disc;
    an enclosure surrounding said vibratory disc adapted to be disposed in communication with said fluid; and
    means for exciting said disc to vibrate in a thickness-shear mode, the frequency of vibration being representative of the pressure of said fluid, wherein said disc and said enclosure are fabricated from silicon.

11. A pressure transducer as recited in claim 10, wherein said exciting means includes means for magnetically exciting said disc.

12. A pressure transducer as recited in claim 10, wherein said enclosure includes a pair of plates, each plate having a reduced thickness portion disposed on each side of said disc, said reduced thickness portions forming two cavities, each cavity being disposed between each plate and the disc.

13. A pressure transducer as recited in claim 12, wherein said reduced thickness portions flex in response to pressure of the fluid whose pressure is being measured.

14. A pressure transducer for measuring the pressure of a fluid, comprising:
   a vibratory disc;
   an enclosure surrounding said vibratory disc adapted to be disposed in communication with said fluid; and
   means for exciting said disc to vibrate in a thickness-shear mode, the frequency of vibration being representative of the pressure of said fluid, wherein said exciting means includes means for magnetically exciting said disc and wherein said magnetic exciting means includes a magnetic structure around said enclosure.

15. A pressure transducer as recited in claim 14, wherein said magnetic structure includes a permanent magnet disposed adjacent said enclosure and means for providing a magnetic return path for said permanent magnet around said disc.

16. A pressure transducer as recited in claim 14, further including an electrode pattern disposed on said disc that cooperates with said magnetic structure to excite said disc when said electrode pattern is electrically energized.

17. A method for measuring the pressure of a fluid, comprising:
   providing a vibratory disc in communication with the pressure of said fluid;
   exciting said disc to vibrate in a thickness-shear mode, the frequency of vibration being representative of the pressure of said fluid wherein said disc is magnetically excited; and
   providing a magnetic structure around said disc.

18. The method recited in claim 17, further including providing an enclosure surrounding said vibratory disc.

19. The method recited in claim 18, including providing portions of said enclosure that flex in response to pressure of the fluid whose pressure is being measured.

20. The method recited in claim 17, including providing permanent magnet disposed adjacent said disc and means for providing a magnetic return path for said permanent magnet around said disc.

21. The method recited in claim 20, further including providing an electrode pattern on said disc that cooperates with said permanent magnet to excite said disc when said electrode pattern is electrically energized.

* * * * *